United States Patent
Stoimenov et al.

(10) Patent No.: US 12,071,353 B2
(45) Date of Patent: Aug. 27, 2024

(54) RECOVERY OF BROMINE FROM WASTE BROMIDE BRINES

(71) Applicant: REACTION 35, LLC, Santa Barbara, CA (US)

(72) Inventors: Peter K. Stoimenov, Goleta, CA (US); Zachary Snodgrass, Santa Barbara, CA (US); John C. Matsubu, Santa Barbara, CA (US)

(73) Assignee: REACTION 35, LLC, Santa Barbara, CA (US)

( * ) Notice: Subject to any disclaimer, the term of this patent is extended or adjusted under 35 U.S.C. 154(b) by 0 days.

(21) Appl. No.: 18/100,470

(22) Filed: Jan. 23, 2023

(65) Prior Publication Data

US 2023/0234846 A1 Jul. 27, 2023

Related U.S. Application Data

(60) Provisional application No. 63/302,446, filed on Jan. 24, 2022.

(51) Int. Cl.
*C01B 7/09* (2006.01)
*C01D 3/10* (2006.01)
*C01D 3/14* (2006.01)

(52) U.S. Cl.
CPC ............... *C01B 7/096* (2013.01); *C01D 3/10* (2013.01); *C01D 3/14* (2013.01)

(58) Field of Classification Search
CPC .......... C01B 7/096; C01B 7/093; C01B 7/09; C01D 3/14; C01D 3/10

USPC ........................................................ 423/503
See application file for complete search history.

(56) References Cited

U.S. PATENT DOCUMENTS

| | | | | |
|---|---|---|---|---|
| 1,379,731 | A | * | 5/1921 | Theimer ................. C01B 7/093 423/482 |
| 2,536,457 | A | * | 1/1951 | Mugdan .................. C01B 7/096 423/502 |
| 3,107,154 | A | * | 10/1963 | Schachter ............... C01B 7/096 423/501 |
| 5,385,650 | A | | 1/1995 | Howarth et al. |

FOREIGN PATENT DOCUMENTS

| | | | | |
|---|---|---|---|---|
| CN | 108751232 | A | * 11/2018 | ............. C01B 7/096 |
| CN | 111517279 | A | 8/2020 | |
| CN | 211620237 | U | * 10/2020 | |
| CN | 113307289 | A | * 8/2021 | |
| CN | 113860557 | A | * 12/2021 | |
| EP | 3 753 901 | A1 | * 12/2020 | ............. B01D 3/143 |
| EP | 3753901 | A1 | 12/2020 | |

(Continued)

OTHER PUBLICATIONS

English translation of CN-211620237-U Description (Year: 2020).*

(Continued)

*Primary Examiner* — Anthony J Zimmer
*Assistant Examiner* — Zachary John Baum
(74) *Attorney, Agent, or Firm* — EWING & JONES, PLLC

(57) ABSTRACT

A process includes supplying a bromide brine and removing organic compounds from the bromide brine. The method also includes acidifying the bromide brine to form a stream containing hydrobromic acid and separating the hydrobromic acid from the stream containing hydrobromic acid.

18 Claims, 1 Drawing Sheet

(56) References Cited

FOREIGN PATENT DOCUMENTS

WO     WO-2016132376 A1 *   8/2016
WO         2016187587 A2    11/2016

OTHER PUBLICATIONS

English translation of CN-108751232-A Description (Year: 2018).*
English translation of CN-113860557-A Description (Year: 2021).*
English translation of CN-113307289-A Description (Year: 2021).*
International Search Report and Written Opinion issued in PCT App. No. PCT/US2023/011356, dated May 22, 2023 (9 pages).

* cited by examiner

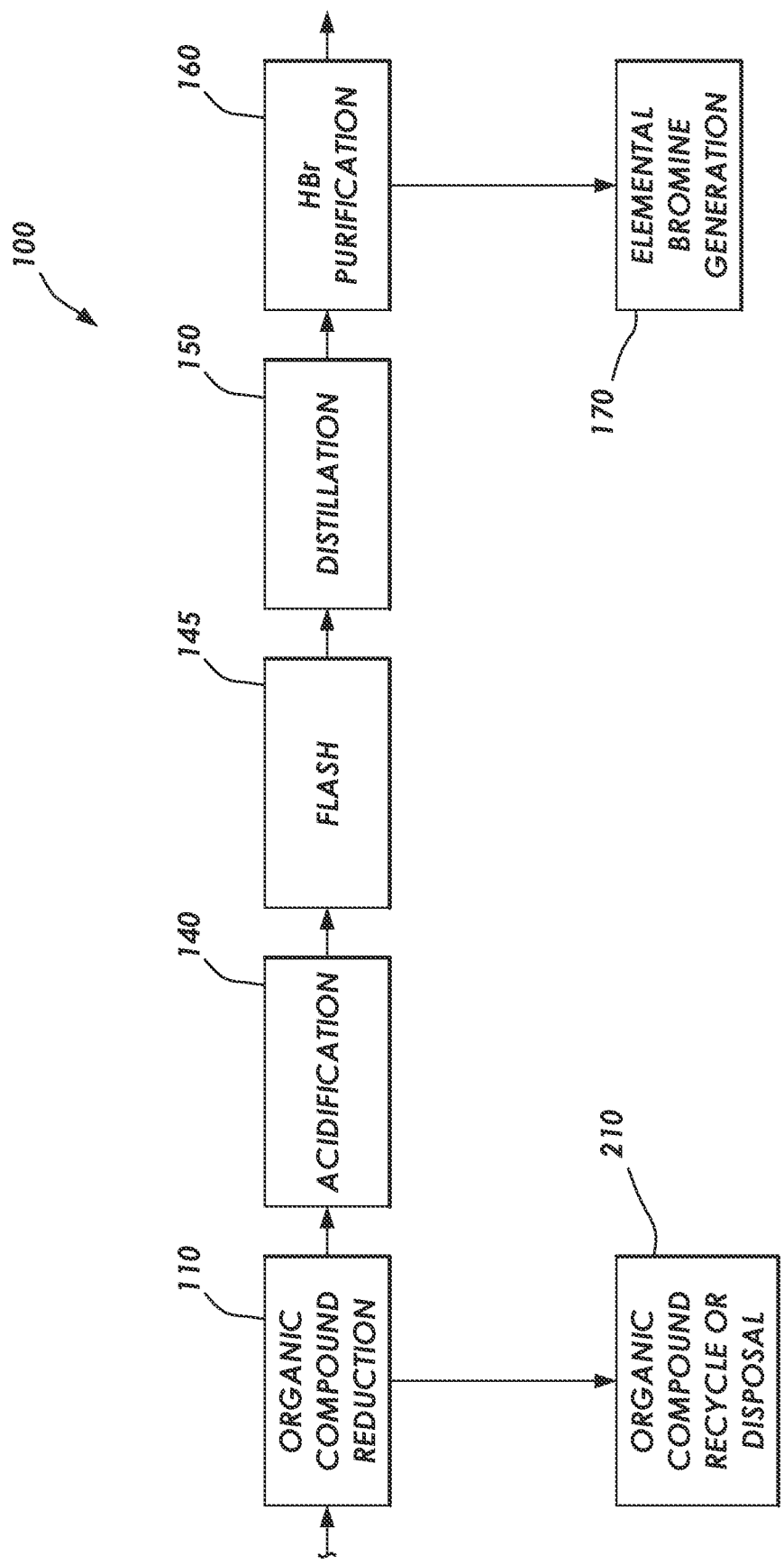

RECOVERY OF BROMINE FROM WASTE BROMIDE BRINES

CROSS REFERENCE TO RELATED APPLICATIONS

This application is a nonprovisional application which claims priority from U.S. provisional application No. 63/302,446, filed Jan. 24, 2022, which is incorporated by reference herein in its entirety.

FIELD OF THE DISCLOSURE

The disclosure is directed to the recovery of HBr from aqueous streams.

BACKGROUND

Synthesis of many agrochemicals, pharmaceuticals, and flame retardants involves the use of organic bromide compounds. Organic bromide compounds are desirable reagents because they may provide higher yields compared to their chloride counterparts. Organic bromides are traditionally easy to synthesize and many are produced in large quantities. Typically, organic bromides participate in elimination reactions which generate metal bromides as elimination byproducts, traditionally dissolved in water. The resulting aqueous solution is often contaminated with precursors, intermediates, and byproducts along with catalysts and solvents. The aqueous solution is also frequently contaminated with other metal halide salts, such as chlorides.

Brominated flame retardant synthesis typically produces a byproduct stream of hydrobromic acid, usually contaminated with organic compounds. The aqueous waste from these processes is traditionally difficult to dispose of or otherwise treat. One common approach is to concentrate the waste bromide by removing solvent, thereby reducing the volume of the aqueous waste. This concentrated aqueous stream is then incinerated, destroying the organic compounds. Waste containing halogens or halides is typically more costly to incinerate, due to the need for more complex equipment and specialized materials of construction.

Bromide brines, including calcium bromide, sodium bromide, and zinc bromide, are often used in oil and gas production. For example, after drilling an oil well, drilling mud, cuttings, and other materials must be removed from the wellbore before oil and gas production may be initiated. Bromide brines supply the high density required to offset the high pressures that can be encountered in oil and gas wells. Frequently, additives, such as surfactants, viscosifiers, anti-corrosion additives, etc. are added to the brine to augment its ability to remove materials from the well bore. Following use, the brines contain additives, materials removed from the well bore, and other contaminants.

SUMMARY

In an embodiment of the present disclosure, a process is disclosed. The process includes supplying a bromide brine and removing organic compounds from the bromide brine. The method also includes acidifying the bromide brine to form a stream containing hydrobromic acid and separating the hydrobromic acid from the stream containing hydrobromic acid.

In another embodiment, a process includes supplying a waste bromide liquid generated from flame retardants manufacture containing hydrobromic acid. The process also includes removing an organic compound from the waste bromide liquid to form a stream containing hydrobromic acid and separating the hydrobromic acid from the stream containing hydrobromic acid.

BRIEF DESCRIPTION OF THE DRAWING

The present disclosure is best understood from the detailed description when read with the accompanying figures. In accordance with the standard practice in the industry, various features are not drawn to scale. Schematic drawings are structural or procedural diagrams.

The FIGURE is a schematic view of an embodiment of a bromide recovery method consistent with the present disclosure.

DETAILED DESCRIPTION

The following disclosure provides many different embodiments and examples. Specific examples of equipment and arrangements are described below to simplify the present disclosure. These are merely examples and are not intended to be limiting. In addition, the present disclosure may repeat reference numerals and/or letters in the various examples. This repetition is for simplicity and clarity and does not in itself dictate a relationship between the various embodiments and/or configurations discussed.

Various terms are used herein. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that any ranges include iterative ranges of like magnitude falling within the expressly stated ranges or limitations.

Certain embodiments of the present disclosure are directed to a process to recover and recycle bromine or hydrobromic acid from bromide brines with organic precursors, intermediates, and products. In certain embodiments, as described below, the bromide brine is aqueous. In some embodiments, the bromide brine is reduced in volume and therefore less expensive to handle and dispose of, while recovering a fraction up to and including 100% of the available bromine.

In other embodiments, a process to recover and recycle bromine or hydrobromic acid from waste from brominated flame-retardant manufacturing, which contains a high concentration of hydrogen bromide.

As used in this disclosure "bromine" refers to bromine compounds, such as hydrobromic acid, and elemental bromine. "Elemental bromine" refers to $Br_2$. In addition, one or more of the organic compounds may also be recovered.

In some embodiments of the present disclosure, the process to recover bromine includes steps that include adjustable operational conditions depending on the nature of the bromide brine components that are being recovered. In certain embodiments, some steps may be combined or switched.

The FIGURE depicts a schematic of bromine recovery process 100. In certain embodiments, bromine recovery process 100 includes organic compound reduction 110. Organic compound reduction 110 may also be used for removal of organic compounds from flame retardant manufacture waste streams. Organic compound reduction 110 may be used to remove a portion of the organic compounds in a bromine brine. The portion removed may be from 1% to 100%. These organic compounds may be dissolved or solubilized in the bromide brine. The early removal of organic contaminants may reduce the potential of side reactions in the later steps of the process to recover bromine where high acidity and high temperature are combined to extract the hydrogen bromide as hydrobromic acid from the brine, as described below. However, as one of ordinary skill in the art will appreciate in light of the present disclosure, organic compound reduction 110 may take place after acidification 140, described hereinbelow.

Organic compound reduction 110 includes one or more processes to reduce the amount of organic compounds in the bromide brine.

pH Adjustment: The solubility of the organic compounds in the bromide brine may be reduced by adjusting the pH of the bromide brine. As solubility of the organic compounds in the bromide brine is decreased, certain quantities of the organic compounds may phase separate into a new liquid and/or solid phase. If desired, the pH endpoint(s) used to reduce the solubility of dissolved organic compounds may be determined by using a sample of the bromide brine and decreasing the bromide brine pH through the addition of an acid or increasing the bromide brine pH through the addition of a base. In some embodiments, the bromide brine is alkaline and may be reduced to a pH between 0 and 7. In certain embodiments, different samples of the bromide brine may be used to adjust the pH of the bromide brine to several different values to determine a pH that results in phase separation of the organic compounds. After quantification of the organic compounds that remain dissolved, a desired pH may be determined. In certain embodiments, different organic compounds may phase separate at different pH's. In such embodiments, it may be useful to perform a first pH shift, followed by organic compound removal, before proceeding with a subsequent pH shift. For example, if the brine contains both organic acids and bases, then organic compounds removed after a first pH shift would not redissolve after a subsequent pH shift. Organic compounds may be reduced to those compound's non-ionized, neutral molecular form, which may result in reduced solubility. Two or more steps of pH adjustment, with removal of phase separated species at the target pH values, may facilitate removal of organic species especially if those species have substantially different solubility minimums as a function of pH.

In certain embodiments, phase separation of organics via pH adjustment may be performed with an acid that does not cause inorganic salts to precipitate. Contact between a second liquid phase and a solid precipitate may result in contaminated solids that are difficult to process. For example, using hydrobromic acid as a means of reducing the pH is unlikely to cause inorganic salt precipitation, unlike hydrochloric or sulfuric acids, which may cause a co-precipitation of the less soluble chlorides and sulfates along with the organic compounds. In certain embodiments, changing the pH may result in the formation of organic solids. It may be desirable to keep these organic solids from mixing with inorganic solids. A mixed solid stream would likely require additional processing to separate the organic solids from the inorganic solids.

Removal of the phase separated organic compounds may be accomplished by, for example and without limitation, decantation, centrifugation, gravity settling, hydrocyclone, filtration, adsorption onto solid media, and other techniques.

Even if no organic compounds phase separate by changes in pH, pH adjustment may still be used to improve the performance of the subsequent steps that remove organic components, described hereinbelow. For example, follow-up treatments such as resin adsorption, steam distillation, and liquid-liquid extraction may be more effective when the organic compounds are in the neutral, molecular state, which may be achieved through pH adjustment.

Temperature Adjustment Alone or in Combination with pH: Organic compound reduction 110 may include temperature alteration as a method of phase separating organic compounds in the bromide brine. Many organic compounds exhibit a steep solubility dependence on temperature. Changes in temperature, typically to lower temperatures, may render organic compounds less soluble causing phase separation and enabling removal by, for example and without limitation, decantation, skimming, filtration, or centrifugation. In certain embodiments, such as when the organic compounds are in an emulsified state, increasing the temperature may help the solubilized organic compounds to coalesce, enabling separation. Temperature adjustment may be combined with the aforementioned pH adjustment, as organic compounds are typically least soluble when the organic compounds are in the neutral, molecular form. Organic compounds separated in organic compound reduction 110 may be recycled, purified, or disposed of in organic compound recycle or disposal 210.

In certain embodiments, it may be desirable to perform pH adjustment and/or temperature adjustment of the bromide brine prior to employing other methods to remove organic compounds, as adjusting the pH and/or temperature may improve the performance of these methods, which are listed hereinbelow.

Liquid-liquid extraction: If the organic compounds remain dissolved in the bromide brine at an undesirable concentration, for example and without limitation, more than 1-2 wt. % dissolved organic content, liquid-liquid extraction using an organic solvent that is immiscible or partially miscible with water may be performed in organic compound reduction 110.

In certain embodiments, liquid-liquid extraction does not include adding water to the bromide brine, as additional water may make bromine recovery more difficult. A solvent for liquid-liquid extraction may be determined by a series of laboratory experiments that determine which organic solvents are suitable. In certain embodiments, consideration is given to the distribution coefficient of the organic compound in the solvent (equilibrium ratio of the targeted compound(s) between the organic phase and aqueous phase), solvent stability, recoverability and recyclability, solvent cost, environmental considerations, and ease of implementation. The liquid-liquid extracting solvent may be a single solvent or a mixture of two or more solvents. Non-limiting examples of liquid-liquid extraction solvents include ethyl acetate, iso-propyl acetate, t-butyl acetate, acetone, methyl ethyl ketone, methyl isobutyl ketone, di-isobutyl ketone, 1-butanol, dim-ethyl ethylene glycol (glyme), dimethyl diethylene glycol (diglyme), methyl isobutyl ketone (MIBK), methyl tert-butyl ether, diethyl ether, methoxybenzene (anisole).

In certain embodiments, the liquid-liquid extraction solvent may be recovered by phase separation from the bromide brine and transferred to a distillation still. Distillation may separate the extracted organic compounds from the solvent. The solvent may be recycled for extraction, while the recovered organic compounds may be incinerated or otherwise disposed of, purified and sold as a product, or directed to further separation and recovery for reuse in organic compound recycle or disposal 210.

The liquid-liquid extraction may be single stage or multistage and may use well-known designs for liquid-liquid extraction approaches such as mixer-settlers, Scheibel columns, or Karr columns.

Steam Distillation: In certain embodiments, organic compound reduction 110 may include steam distillation in lieu of or in addition to liquid-liquid extraction. If organic compounds are present that are partially miscible with water, steam distillation may be employed for separation of the organic compounds.

The applicability and usefulness of either steam distillation or liquid-liquid extraction may be determined by the chemical identity and concentration of the organic compounds. Steam distillation may be used to remove all or a fraction of the organic compounds.

Solid Adsorbents: In certain embodiments, bromine recovery process 100 and organic compound reduction 110 may include the use of a solid adsorbent to capture contaminants. Non-limiting examples of such solid adsorbents include activated carbon and polymeric resins. For bromide brines with low levels of organic contaminants (e.g., 0.05-2.0 wt. %), adsorption resins may be used to effect contaminant removal. The adsorption resins are typically porous, crosslinked polymer structures that may remove hydrophobic, macromolecular, or low polarity compounds from aqueous solutions.

Polymer adsorption resins may be obtained from Dupont, Purolite, Dow, Mitsubishi Chemical, and others. In certain embodiments, a polymer adsorption resin may be selected through conducting laboratory experiments. For example, contaminant breakthrough curves or Freundlich isotherms may be generated for components to predict contaminant concentrations as a function of volume passed over the resin. The resins may be preconditioned and regenerated once the resins are loaded with the contaminant(s) being removed. An adsorption system may be sized such that predefined quantities of organic compounds are allowed to break through the bed and continue downstream. In certain embodiments, Dowex® Optipore® L493, a highly cross-linked styrenic polymer, and Amberlite® XAD4, a styrene-divinylbenzene polymer, may be used as the polymer adsorption resins. Alternatively, activated carbon may be used as a sorbent.

Vapor Phase Adsorption: In some embodiments, organic compound reduction 110 may include the use of adsorption resins for adsorption of organic compounds from a vapor that includes hydrogen bromide and water. In this embodiment, the vapor is directed over the adsorption resin, which results in the organic compound(s) adhering to the resin, while the remaining vapor constituents pass through. An example of resin that may be used in gas phase adsorption of organic compounds is the Dowex® Optipore® V503 resin. Alternatively, activated carbon may be used as an adsorbent. Organic compounds adsorbed by adsorption or may be recycled or disposed of in organic compound recycle or disposal 210.

Following organic compound reduction 110, acidification of the bromide brine to generate hydrobromic acid may be performed in acidification 140.

If desired, organic components may be removed by any combination of the methods of organic compound reduction 110 prior to distillation. Bromine from the bromide brine may be recovered as hydrobromic acid by acidification with a strong, non-volatile acid (e.g., sulfuric acid, phosphoric acid), in acidification 140. For waste bromide liquids generated from flame retardants manufacture, no acidification may be necessary as the waste liquid is itself hydrobromic acid Halide salts may be among the most soluble salts for most metals. Acidification with a strong acid (such as sulfuric acid) may result in precipitation, through the formation of a less soluble salt (e.g., sulfate) as shown in equations 1 and 2. When the strong mineral acid is added at ambient temperature, salt crystals may precipitate, though this may not be the case at elevated temperature (e.g., sodium hydrogen sulfate has over two times higher water solubility at 100° C. compared to 25° C.). In certain embodiments, a temperature below ambient may be maintained during or after acidification to reduce the solubility and recover a portion of the sulfates as filterable solids.

$$NaBr + H_2SO_4 \rightarrow NaHSO_4 + HBr \quad (1)$$

$$CaBr_2 + H_2SO_4 \rightarrow CaSO_4 + 2\ HBr \quad (2)$$

The amount of strong mineral acid added may be from 1-100% excess so that in certain embodiments, stoichiometrically all bromide may be recovered from the system as hydrobromic acid.

A higher excess of mineral acid (e.g. 20-70 wt. %) may be used to modify the hydrogen bromide/water azeotrope, such that hydrobromic acid with a higher concentration than the azeotrope (48 wt. %) can be recovered. In such embodiments, without being bound by theory, the acid activity is not chemical but physico-chemical that changes the strength of the interaction between hydrogen bromide and water. The excess acid may be recycled for acidification in earlier stages of this process. This approach may be used to recover hydrogen bromide gas (anhydrous) rather than hydrobromic acid.

In certain embodiments, a 5% stoichiometric excess may balance between sulfuric acid expense and hydrogen bromide recovery.

In certain embodiments, the precipitate may include fine crystals that may be difficult to filter (e.g., calcium sulfate). The precipitated crystals may also retain liquid, which contains hydrobromic acid. In certain embodiments, it may be desirable to enlarge the crystals deliberately in-situ. The precipitated crystal size may be increased by heating the slurry above ambient temperature (e.g., 30-70° C., or about 40° C.) for a duration between 15 minutes and 6 hours (specifically beneficial for calcium sulfate precipitate; this process may not be needed for certain salts, such as highly soluble sulfates and hydrogen sulfates salts). The aging and growth process may increase average crystallite size and aid crystallization of the amorphous $CaSO_4$, which makes filtering and washing the precipitate faster and more efficient. After the aging step (if needed), the precipitated metal salts may be recovered by filtration, rinsed, and dried. Aging $CaSO_4$ precipitates in the ranges of 40-60° C. for a duration of 2-24 hours may aid filtration and centrifugation, although shorter durations are contemplated by this disclosure. Similar aging procedures may have a similar impact on other potential precipitates, such as calcium phosphate.

Following acidification 140, in some optional embodiments, it is desirable to separate the salts prior to the recovery of hydrobromic acid. For example, the bromide brine may be subjected to a flash step (145) to separate soluble salts and low volatility compounds (e.g. high boiling organics) from hydrobromic acid. The flash temperature should be sufficient to flash the hydrobromic acid without also volatilizing undesirable quantities of high boiling species. Flash 145 may include distillation or rectification.

During the distillation or rectification, the bottoms may be passed, periodically or continuously, through a filter that retains the solids that may form, as the solids concentration may grow over time as water is removed from the system by evaporation.

Following acidification 140 or flash 145, distillation 150 may be used to separate and recover hydrobromic acid from other species with higher or lower volatility, such as non-volatile sulfate salts, excess mineral acids, and any organic compounds that were not removed in the previous steps. The feed to distillation may contain hydrobromic acid, hydrochloric acid, dissolved solids, residual organic compounds that were not removed in the initial steps of the treatment process, and new organic compounds formed in the organics compound reduction 110, acidification 140, or flash 145 steps.

Distillation 150 may be performed in either batch or continuous mode, depending on, for example, the volume and the delivery frequency of the bromide brine.

The fractions generated in distillation 150 may include, in order of their volatility, 1) volatile organic compounds or organic compounds that distill with water steam 2) pure water 3) water containing hydrochloric acid 4) concentrated hydrobromic acid. Heavier distilling fractions may accumulate in the refluxed bottoms and be removed by occasional purging. In some embodiments, hydrobromic acid is taken as a bottoms product.

In certain embodiments, during the distillation, the refluxing liquid may be passed periodically or continuously through a filter that retains solids that may form during the distillation. The concentration of solids, dissolved or otherwise, may grow as water is removed from the system by evaporation.

Species that are not removed by distillation or filtration may be removed from distillation 150 by including a purge to remove species that accumulate in the distillation system such as dissolved non-volatile organic compounds, excess sulfuric acid, and other trace level components.

In certain embodiments, hydrobromic acid purification 160 is performed. The desired HBr product may be, for example the azeotropic, 48 wt. % aqueous hydrobromic acid.

The hydrobromic acid may be passed through a sorbent bed containing polymer adsorption resin(s), or activated carbon, capable of capturing the remaining contaminants. As one of ordinary skill in the art will recognize in light of this disclosure, the sorbent bed purification of hydrobromic acid purification is exemplary and other methods may be used.

In certain embodiments, the hydrobromic acid may be recovered from distillation as a bottoms product. For example, if the type and concentration of the contaminants in the acidified brine that have boiling points at or higher than hydrobromic acid are acceptable in the hydrobromic acid product, the hydrobromic acid may be recovered as a bottoms product.

In certain optional embodiments, the bromine recovery process may convert a stream of hydrogen bromide, including aqueous hydrobromic acid, to elemental bromine in elemental bromine generation 170. The azeotropic hydrobromic acid may generate elemental bromine that may be used for manufacture of completion brines, pharmaceutical and agricultural intermediates, and many other applications.

In some embodiments, using hydrobromic acid in organic compound reduction 110 may induce organic compounds to separate into a phase that can be removed by phase separation. Additional adsorption of the remaining dissolved organic compounds in the aqueous brine is accomplished by passing the aqueous brine through a bed of polymer adsorption resin, such as Dowex® Amberlite® XAD4 and Dowex® Optipore® L493, to adsorb dissolved organic compounds. Acidification of the purified brine with 80 wt. % sulfuric acid in a 5% stoichiometric access (target ratio sulfuric acid to halogen is 1:1) and removal of the sodium sulfates crystals may be performed by filtration. The remaining liquid may be flashed and distilled to recover several fractions. For example, the fraction that boils at 124° C. at ambient pressure may be >40 wt. % hydrobromic acid.

HYPOTHETICAL EXAMPLES

Hypothetical Example 1

A byproduct stream from a chemical synthesis in an aqueous solution comprised of NaBr (12 wt %), containing the following organic impurities: n-hexanoic acid (500 ppm), ortho-chloroanisole (0.2 wt %), acrylic acid (0.5 wt %), 4-bromo-1-butanol (0.3 wt %), and bromobenzene (800 ppm) may be used. The solution may have a pH of 10.3 at ambient conditions.

Results from treatments: The solution may be acidified with sufficient 48% hydrobromic acid to a pH of 2. This may result in the formation of a separate organic layer on top of the solution comprised of mostly chloroanisole, bromobenzene, and 4-bromo-1-butanol with small amounts of the other organic contaminants also phase separating.

Once the organic layer has been removed by decanting, the resulting aqueous phase may be subjected to liquid-liquid extraction with 1-butanol. This may result in more than a 95% reduction in the residual concentration of all organic compounds and may introduce small amounts of 1-butanol (e.g., 50-500 ppm) in the aqueous phase.

The aqueous phase may be then passed through a column loaded with Dow Optipore® L493 resin and may result in a sodium bromide effluent solution that is substantially free of any of the starting organic contaminants (less than 50 ppm total, 10 ppm each) as well as the 1-butanol used as extracting liquid.

The bromide brine may then be used as a starting material in the preparation of high purity hydrobromic acid as described herein.

Hypothetical Example 2

A byproduct stream from the manufacture of flame retardant may include approximately 46 wt. % hydrobromic acid, containing diphenyl, perbromodiphenyl, dichloromethane and tribromophenol (e.g., 150 ppm each). The pH of the solution may be 0.

Results from treatments. The solution may be extracted with n-hexane, which may result in the removal of >95% of all dissolved organic compounds.

The output aqueous hydrogen bromide solution may be passed over a bed of activated carbon, which may result in the removal of most or all organic species that were not extracted, plus any dissolved or physically entrained n-hexane resulting in a substantially free from organic compounds bromide brine stream.

A distillation may yield high purity, ACS grade hydrobromic acid.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A process comprising:
supplying a bromide brine;
removing an organic compound from the bromide brine by:
  adjusting the pH of the bromide brine to phase separate organic compounds; and
  removing the phase separated organic compounds from the bromide brine;
acidifying the bromide brine to form a stream containing hydrobromic acid;
separating the hydrobromic acid from the stream containing hydrobromic acid;
acidifying with an acid the bromide brine to form hydrobromic acid; and
separating the hydrobromic acid from other species with higher and lower volatility through distillation after the step of acidifying the bromide brine to form hydrobromic acid, wherein the step of separating the hydrobromic acid includes forming the following streams:
  1) volatile organic compounds or organic compounds that distill with steam;
  2) water;
  3) a water containing hydrochloric acid; and
  4) hydrobromic acid.

2. The process of claim 1, wherein the step of adjusting the pH of the bromide brine is performed at least twice.

3. The process of claim 1, wherein the step of removing organic compounds includes:
adjusting the temperature of the bromide brine to create phase separated organic compounds; and
removing the phase separated organic compounds from the bromide brine.

4. The process of claim 1, wherein the step of removing organics includes:
selecting a solvent; and
performing liquid-liquid extraction using the solvent on the bromide brine.

5. The process of claim 4, wherein the solvent is at least one of ethyl acetate, isopropyl acetate, t-butyl acetate, acetone, methyl ethyl ketone, methyl isobutyl ketone, di-isobutyl ketone, 1-butanol, dimethyl ethylene glycol (glyme), dimethyl diethyleneglycol (diglyme), methyl isobutyl ether (MIBK), diethyl ether, or methoxybenzene (anisole).

6. The process of claim 1, wherein the step of removing organic compounds includes performing steam distillation of the bromide brine.

7. The method of claim 6, wherein the step of performing steam distillation includes stripping organic compounds from the bromide brine.

8. The method of claim 1, wherein the step of removing organic compounds from the bromide brine includes adsorbing organic compounds on resin.

9. The method of claim 8, wherein the resins are porous, cross-linked polymers structures adapted to remove hydrophobic, macromolecular, or low polarity compounds from the bromide brine.

10. The method of claim 1, wherein the step of removing organic compounds from the bromide brine includes extracting organic compounds using a resin or activated carbon.

11. The method of claim 10, wherein the step of extracting organic compounds using a resin includes removing organic compounds from a vapor that includes hydrogen bromide, water, and organic compounds.

12. The method of claim 1, wherein the step of acidifying the bromide brine is performed using a strong, non-volatile acid.

13. The method of claim 1, wherein the acid is sulfuric or phosphoric acid.

14. The method of claim 1, wherein after the step of acidifying the bromide brine:
flashing at least a portion of the bromide brine.

15. The method of claim 14, wherein the step of flashing at least a portion of the bromide brine includes flashing hydrobromic acid.

16. The method of claim 1 further comprising:
purifying the hydrobromic acid to form purified hydrobromic acid.

17. The method of claim 16, wherein the step of purifying the hydrobromic acid is performed by distilling the hydrobromic acid or passing the hydrobromic acid over a sorbent bed.

18. The method of claim 16, further comprising after the step of forming purified hydrobromic acid:
converting the hydrobromic acid to elemental bromine.

* * * * *